United States Patent [19]

Brogdon, Jr. et al.

[11] 4,017,047

[45] Apr. 12, 1977

[54] QUICK-RELEASE ROLLER ATTACHMENT FOR SUPPORTING A ROPE OR HOSE AND THE LIKE ON AN AERIAL LADDER

[75] Inventors: Glenn F. Brogdon, Jr., Manassas; Algar H. Cosby, Chantilly, both of Va.

[73] Assignee: C. T. Inc., Manassas, Va.

[22] Filed: May 21, 1976

[21] Appl. No.: 688,580

[52] U.S. Cl. .................................. 248/55; 182/129

[51] Int. Cl.[2] .......................................... H02G 3/04

[58] Field of Search .................. 182/129, 230, 206; 248/55, 210

[56] References Cited

UNITED STATES PATENTS

| | | | |
|---|---|---|---|
| 1,393,048 | 10/1921 | Stiles | 182/206 |
| 1,695,428 | 12/1928 | Johnson | 182/206 |
| 3,941,341 | 3/1976 | Brogdon | 182/129 |

*Primary Examiner*—Reinaldo P. Machado
*Attorney, Agent, or Firm*—Shoemaker and Mattare, Ltd.

[57] ABSTRACT

A quick attaching and quick releasing roller attachment for aerial ladders on fire fighting equipment and the like to support a rope or hose and the like on the ladder includes a pair of spaced, rung embracing channels carried by an overcenter type linkage, and rope or hose supporting rollers arranged such that in a first, expanded position of the overcenter linkage the channels are positioned adjacent a selected pair of ladder rungs, and in another, latched position of the linkage the channels are moved toward one another in secure engagement with the rungs and the rollers are disposed in a position to support the rope or hose and the like in spaced relation to the rungs.

8 Claims, 5 Drawing Figures

QUICK-RELEASE ROLLER ATTACHMENT FOR SUPPORTING A ROPE OR HOSE AND THE LIKE ON AN AERIAL LADDER

BACKGROUND OF THE INVENTION

It is sometimes necessary to use aerial ladders on fire fighting equipment and the like in order to reach the upper floors of multistory buildings to effect rescue of persons or to support a hose in an elevated position to direct water onto the roof or into the upper stories of multistory buildings. If the person being rescued is injured, then a rescue basket is used with a rope attached thereto and the rope is strung across one of the rungs near the end of the fly section of the aerial ladder, with the basket suspended therefrom and the basket is lowered to the ground, using the rung as a pulley for supporting the rope and basket. Similarly, when a hose is raised to an elevated position to discharge water onto the roof or into the upper stories of a building, the hose is supported on an uppermost rung of the ladder. The rungs on aerial ladders are typically covered with a friction material and, accordingly, it is not practicable to support the rope or hose directly on the rung, since damage to either the rung or rope or hose, or to both, would probably result.

Therefore, in the prior art several devices are provided for attachement to the rungs of a ladder, which devices have rollers thereon to rollably support the rope or hose. Such prior art devices are either expensive to manufacture or are difficult and time consuming to apply to and remove from the rungs of the ladder or they are subject to being dislodged from the rungs during use thereof.

In accordance with the present invention, a quick attaching and quick releasing roller attachment is provided for aerial ladders, which is economical to manufacture and is quick and easy to apply to and remove from the rungs and which remains in a securely latched position on the rungs during use thereof.

OBJECTS OF THE INVENTION

Accordingly, it is an object of this invention to provide a quick attaching and quick releasing roller attachment for an aerial ladder, wherein the attachment may be quickly and easily applied to and removed from the rungs of the ladder and wherein the attachment is securely engaged in operative position when in use.

DETAILED DESCRIPTION OF THE INVENTION

Figure 1:
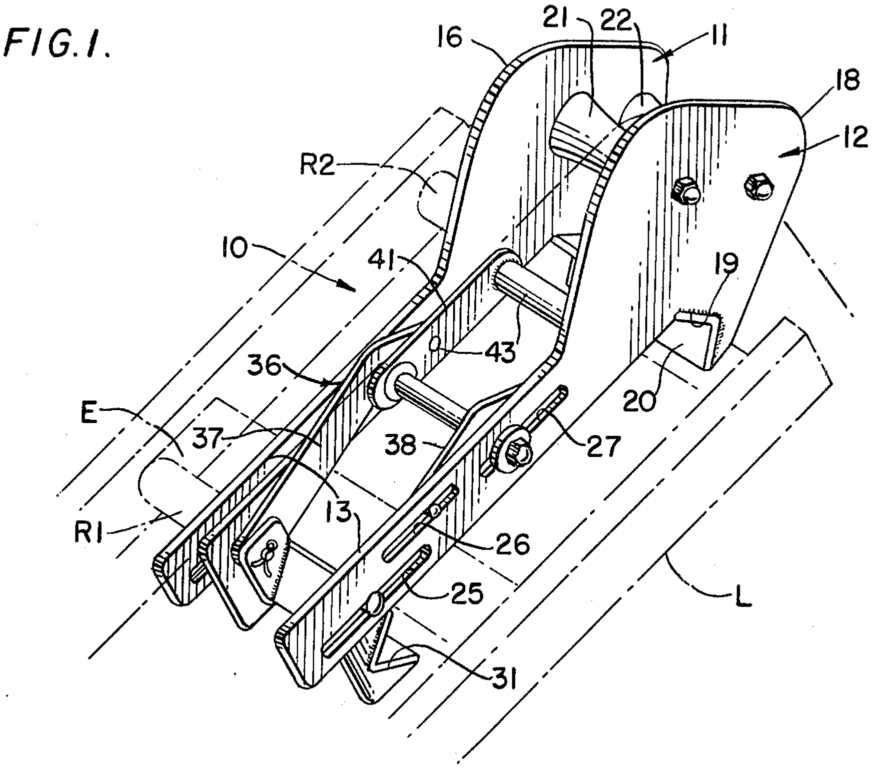
FIG. 1 is an enlarged, fragmentary, perspective view of a portion of a ladder showing the attachment in accordance with the invention secured thereto on a pair of spaced rungs.
Figure 2:
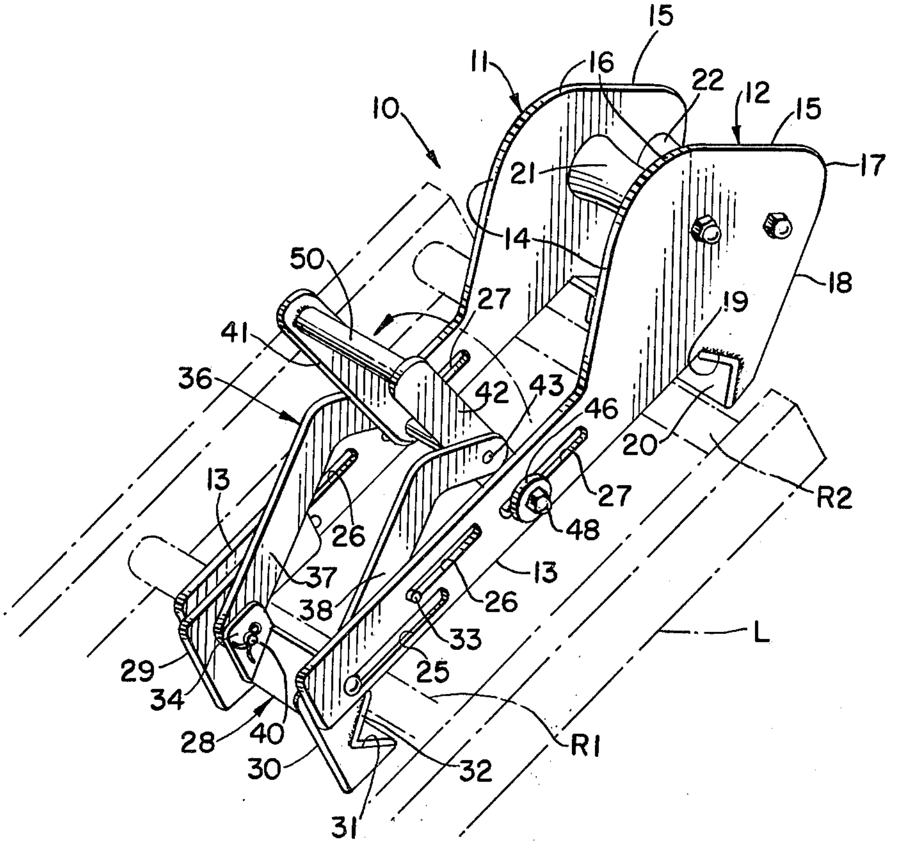
FIG. 2 is an enlarged, perspective view showing the attachment being unlatched or removed from a ladder.

In the drawings, wherein like reference numerals indicate like parts throughout the several views, a section of a ladder is indicated generally at L in FIG. 1. Typically, this ladder section would comprise the fly section or topmost section of an aerial ladder. The ladder has a plurality of spaced rungs R1 and R2 and the rungs are covered with a friction material F. Additionally, rung R1 is reinforced by means of a channel-shaped extension E affixed to the rung, as by a weld or the like, and fixed at opposite ends to the inner sides of the risers or side rails of the ladder L.

An attachment 10 in accordance with the invention comprises a pair of elongate, substantially identical side links or plates 11 and 12 made of a suitably strong, yet lightweight material, such as aluminum or the like. Each of the plates 11 and 12 comprises an elongate, substantially flat, rectangularly shaped portion 13 extending from one end thereof over approximately one-half the length of the plates. The other end portions of the plates are of substantially greater width than the portions 13, and include upwardly converging edges 14 and 15 terminating in an upper rounded apex 16. The edge 15 extends forwardly and downwardly from the apex 16 to a forwardly projecting nose portion 17 positioned below the rectangularly shaped portion 13. The bottom edge 18 of the nose portion extends rearwardly toward and below the portion 13 and a V-shaped notch 19 is formed therein. An angle member 20 is welded or otherwise suitably fixed in nested relationship in the notches 19 in the spaced apart plates 11 and 12 for engaging on the rung R2 of the ladder when the attachment is in use. The angle member 20 insures that the attachment may be used with rungs having various diameters. A pair of arcuate, concave rollers 21 and 22 are rotatably supported on axles 23 and 24 carried by and extending between the plates in spaced relation to the edges 14 and 15 and the apex 16 and nose 17 thereof, whereby a rope or hose or the like trained over the rollers 21 and 22 will be guided and maintained in contact with the rollers, and because of the upstanding portions of the plates at the ends of the rollers, there is little likelihood of the rope or hose and the like being displaced from the attachment. Moreover, the rollers are preferably made of wood or other suitable, low cost material, and because the wood has a natural roughened surface, rotation of the rollers is insured when a rope or hose and the like is moved over the rollers, and thus abrasion on the rope or hose and the like is avoided.

First, second and third elongate, longitudinally extending slots 25, 26 and 27, respectively, are formed in the portions 13 of the side plates 11 and 12. Slot 25 is disposed near the end of portion 13 adjacent the bottom edge thereof and extends inwardly over approximately one-third the length of portion 13. Slot 26 is spaced upwardly from slot 25 adjacent the upper edge of portion 13 and extends in overlapping relationship with slot 25 and projects therebeyond toward the end portions on which the rollers are supported. Slot 27 is spaced from slot 26 and extends from a point adjacent the juncture of edge 14 with portion 13 toward the slot 26. Slot 27 is positioned on the medial line of portion 13.

A rung-embracing channel member 28 is carried by the portions 13 at their free or outer ends and includes a pair of substantially L-shaped brackets 29 and 30, each having a V-shaped notch 31 in one leg thereof in which an angle member 32 is nested and suitably secured, as by welding or the like. Thus the angle members 32 and 20 are disposed in aligned, confronting relationship with one another for operative engagement on a pair of spaced rungs R1 and R2 to hold the attachment securely to a ladder. The other legs of the L-shaped brackets 29 and 30 are slidably juxtaposed with the inner facing surfaces of portions 13 and a guide pin 33 is carried by each of said other leg portions of the L-shaped brackets, with the guide pins 33 projecting through the slots 26 in the respective members 13.

A pair of upstanding brackets 34 and 35 are suitably affixed as by welding or the like to the upper inclined surface of angle member 32 adjacent the opposite ends thereof.

An overcenter linkage mechanism 36 is pivotally carried by the portions 13 of side plates 11 and 12 and comprises a pair of substantially flat, angularly shaped side bars or links 37 and 38 pivotally connected at one of their ends to a pivot pin 39 extended through slots 25 and through aligned openings in L-shaped brackets 29 and 30, links or bars 37 and 38 and brackets 34 and 35. Cotter keys or the like 40 secure the pins in position through the aligned openings and slots 25. The other ends of side links 37 and 38 are pivotally connected to a pair of elongate, substantially flat, rectangularly shaped side bars 41 and 42 between the ends thereof by means of pivot pins 43 engaged with said other ends of the side links 37 and 38 and with the side bars 41 and 42. One end of the side bars 41 and 42 is pivotally supported on an elongate rod 44 extending between the side plates 11 and 12 and projecting at its opposite ends through the slots 27 therein. A pair of washers 45 and 46 are positioned on the rod 44 on opposite sides of the portion 13 of side plates 11 and 12, and a jam nut 47 is engaged against inner washer 45 and an acorn nut or the like 48 is threadably engaged on the outer projecting ends of rod 44 securely clamping and positioning the rod 44 in an adjusted position along the slot 27. A tubular sleeve 49 is rotatably and concentrically positioned on the rod 44 and is welded or otherwise suitably affixed at its opposite ends to the inner confronting end surface portions of side bars 41 and 42. A handle 50 is welded or otherwise suitably affixed at its opposite ends to the inner confronting surface portions of the other ends of side bars 41 and 42 for manipulating the side bars between the full line position in FIG. 3 and the dot-and-dash line position in FIG. 3 to latch and unlatch, respectively, the attachment to a ladder. By loosening the acorn nuts 48 and adjusting the position of the rod 44 in the slots 27, the distance or spacing between angle members 20 and 32 can be adjusted to accommodate the attachment to different rung spacings on different ladders.

Most of the components of the attachment of the present invention are made of a strong, lightweight material, such as aluminum or the like, and the pivot pins and rods and the like interconnecting the various components are preferably made of steel or other suitable strong material.

Figure 3:
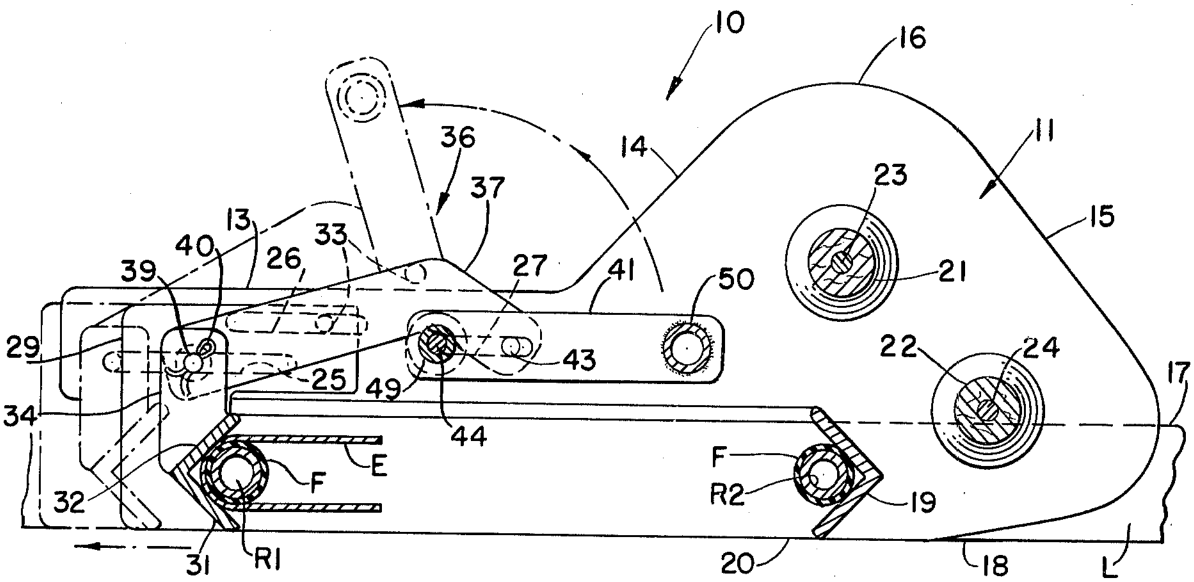
FIG. 3 is an enlarged, sectional view of the attachment, shown in latched position in full lines, and in unlatched position in dot-and-dash lines.
Figure 4:
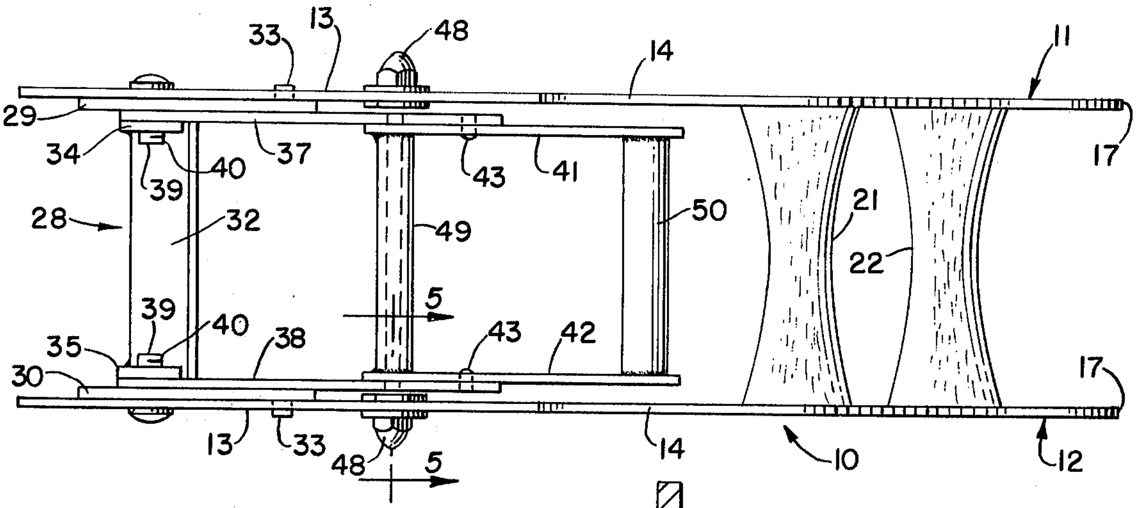
FIG. 4 is a plan view of the device of FIG. 3.
Figure 5:
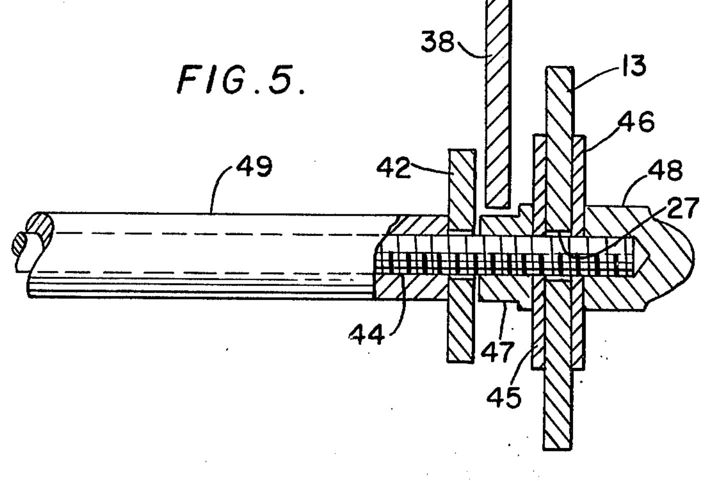
FIG. 5 is an enlarged, fragmentary, sectional view taken along line 5—5 of FIG. 4.

As seen in FIG. 3, the side plates 11 and 12 do not project below the plane of the ladder, and thus the attachment may be placed on the ladder when it is in its stored position on the supporting vehicle, and the ladder then extended to an elevated, operative position. This has the advantage of enabling the attachment to be placed on the ladder without requiring a fireman or other person to climb the ladder and also enables a rope or hose or the like to be operatively positioned on the roller prior to elevation of the ladder, thus enabling the ladder to be used to raise the rope or hose or the like to the desired elevation.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. A quick-connect and quick-disconnect roller attachment for supporting a rope or hose and the like on an aerial ladder and the like, comprises: a pair of substantially identical, flat, parallel side plates; roller means connected at opposite ends thereof to the side plates and extending transversely therebetween for supporting a rope or hose and the like; first rung-engaging channel means carried by the side plates at one of their ends and extending transversely therebetween in a position to engage a rung of a ladder; second rung engaging channel means movably carried by the side plates at their other ends and extending transversely therebetween in opposed relation to said first rung-engaging channel means for engaging another rung of a ladder to secure the attachment to a ladder; and linkage means carried by the side plates and connected to the second rung-engaging channel means for selectively moving the second rung-engaging channel means into and out of operative engagement with a pair of spaced rungs of a ladder, said linkage means including an overcenter mechanism to latch the attachment in rung engaging position.

2. An attachment as in claim 1, wherein said second rung-engaging channel means is slidably carried by said side plates for sliding movement toward and away from said first rung-engaging channel means.

3. An attachment as in claim 2, wherein said side plates have a plurality of longitidinally extending slots therein and the second rung-engaging channel means is slidably guided in a spaced pair of the slots.

4. An attachment as in claim 3, wherein the linkage means is adjustably carried by said side plates for adjusting the distance between the rung-engaging channel means to accommodate ladders of different rung spacing.

5. An attachment as in claim 4, wherein a linkage attaching rod extends between the side plates and projects at its opposite ends through slots in the side plates, fastening means on the said opposite ends of the rod to secure the rod in adjusted position along the slots, said linkage means carried by said rod, whereby adjustment of said rod in said slots adjusts the position of the second rung-engaging channel means relative to the first rung-engaging channel means.

6. An attachment as in claim 1, wherein the roller means comprise a pair of spaced rollers.

7. An attachment as in claim 6, wherein the rollers are made of wood and have an arcuate, concave outer surface.

8. An attachment as in claim 7, wherein the channel means comprise angle members capable of accommodating rungs of different size.

* * * * *